United States Patent [19]
Wickholm et al.

[11] Patent Number: 5,381,264
[45] Date of Patent: * Jan. 10, 1995

[54] MULTIPLE FIELD OF VIEW SENSOR LENS ASSEMBLY

[75] Inventors: David R. Wickholm; James S. Tingstad; Robert S. Haek; Rene D. Perez, all of Tucson, Ariz.

[73] Assignee: Hughes Aircraft Company, Los Angeles, Calif.

[*] Notice: The portion of the term of this patent subsequent to Jan. 25, 2011 has been disclaimed.

[21] Appl. No.: 69,333

[22] Filed: Jun. 1, 1993

Related U.S. Application Data

[62] Division of Ser. No. 765,787, Sep. 19, 1991, Pat. No. 5,282,087.

[51] Int. Cl.[6] .............................................. G02B 23/00
[52] U.S. Cl. .................................. 359/419; 359/754; 359/793; 359/808; 359/822; 359/829; 250/234
[58] Field of Search .......................... 359/399–403, 359/405–406, 419–422, 754, 755, 793, 808, 811, 819–822, 829, 830, 823; 250/234

[56] References Cited

U.S. PATENT DOCUMENTS 3,781,559 12/1973 Cooper et al. .
5,282,087 1/1994 Wichholm et al. ............... 359/419

FOREIGN PATENT DOCUMENTS 3918416 12/1990 Germany .
2152227 7/1985 United Kingdom .

*Primary Examiner*—Loha Ben
*Assistant Examiner*—James Phan
*Attorney, Agent, or Firm*—Charles D. Brown; Randall M. Heald; Wanda K. Denson-Low

[57] ABSTRACT

A multiple field of view sensor lens assembly suitable for inclusion in an infrared imaging system. The lens assembly includes a rotatable telescope 10 for providing first and second fields of view for the sensor, the first field of view being along a first axis thereof L and the second field of view being along a separate second axis T. A servo mechanism 30 is included for rotating the telescope 10 from a first orientation at which the first axis is aligned with the optical axis to a second orientation at which the second axis is aligned with the optical axis. In a preferred embodiment the inventive lens assembly is disposed to provide fields of view in opposing directions along the first axis L, and a third field along the second axis T.

7 Claims, 2 Drawing Sheets

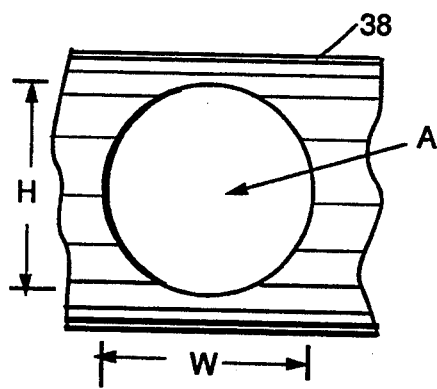
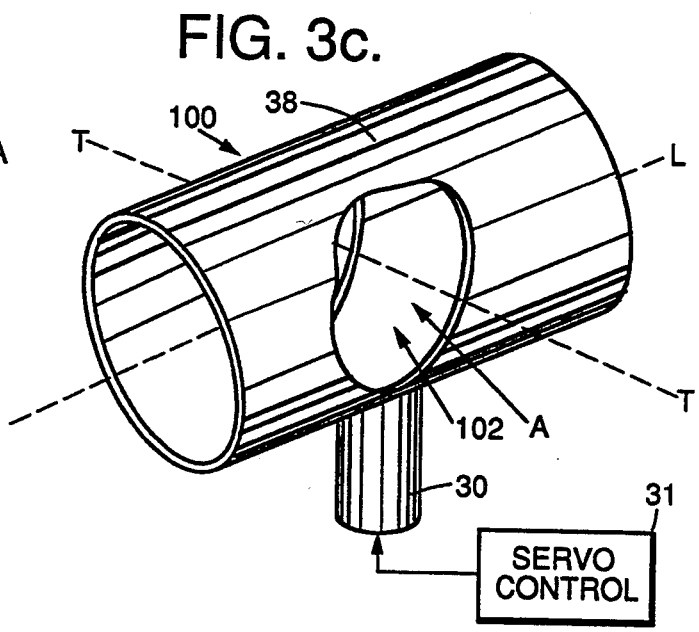
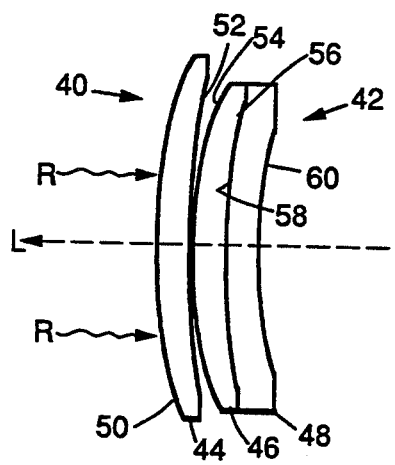
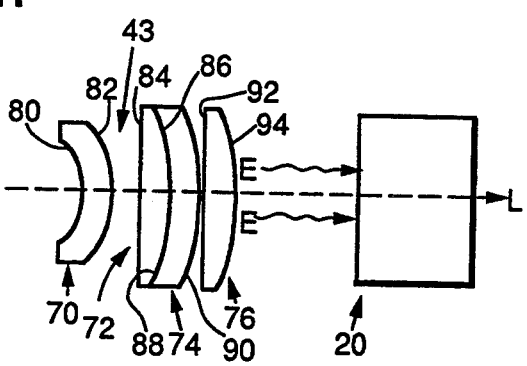
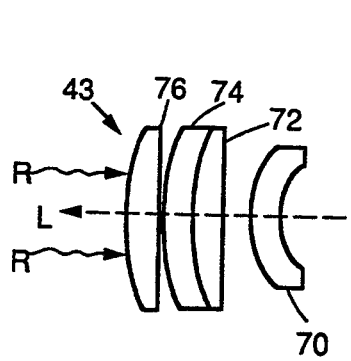
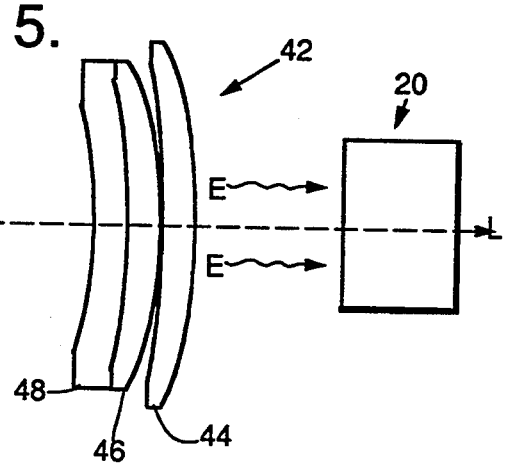

5,381,264

MULTIPLE FIELD OF VIEW SENSOR LENS ASSEMBLY

This is a division of application Ser. No. 07/765,787, field Sep. 26, 1991, now U.S. Pat. No. 5,282,087.

BACKGROUND OF THE INVENTION

1. Field of the Invention

This invention relates to optical arrangements used in imaging systems. More specifically, this invention relates to optical arrangements operative to modify the fields of view of sensors included within such imaging systems.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Infrared imaging systems are used in a variety of military and commercial applications to provide either an operator or a guidance system with a view of a scene. Such imaging systems typically include a sensor arrangement capable of collecting radiant energy originating from within a field of view of the scene. The sensor arrangement will typically include several optical elements configured to focus incident scene energy upon a detector (such as a focal plane array). The optical elements are selected to provide the sensor with a desired field of view. A wide field of view is advantageous in that it allows a viewer to observe objects therein within the context of a larger scene. However, increases in the field of view result in corresponding decreases in resolution. In certain sensors these competing concerns are addressed by a compromise design having an intermediate field of view.

Various methods have been utilized in an attempt to avoid the necessity of striking a balance between image resolution and field of view. For example, in a particular optical approach the imaging system is designed to incorporate a pair of lens assemblies. One of the assemblies encompasses a wide field of view, while the other covers a relatively narrow field of view. The assemblies are then mechanically moved in and out of the optical train of the sensor to alternately provide a wide field of view or improved resolution. Unfortunately, implementation of this approach typically requires a relatively complex servo system to alternately interpose the lens assemblies in alignment with the sensors. In addition, the employment of more than a single auxiliary lens assembly raises the cost of the imaging system.

As is well known, the focusing power of a lens element is a function of the thickness, index of refraction, and radius of curvature thereof. Since the values of all of these parameters generally vary as a function of temperature, the focusing power of lens assemblies incorporated within imaging systems are subject to temperature-induced variation. In one scheme employed in an attempt to counteract this variation, a mechanical device attached to the lens assembly operates to move the constituent lens elements in response to temperature fluctuations. In this way an effort is made to minimize the impact of temperature change on the performance of the lens assembly. Unfortunately, this movement technique typically relies on a complex and expensive mechanical focus compensation device.

Accordingly, a need exists in the art for a lens assembly capable of providing multiple fields of view to an electromagnetic sensor arrangement.

SUMMARY OF THE INVENTION

The aforementioned need in the art is addressed by the multiple field of view sensor lens assembly of the present invention. The inventive lens assembly may be disposed in an imaging system having an optical axis and a sensor aligned therewith. The lens assembly includes a rotatable telescope for providing first and second fields of view for the sensor, the first field of view being along a first axis thereof and the second field of view being along a separate second axis. A servo mechanism is included for rotating the telescope from a first orientation at which the first axis is aligned with the optical axis to a second orientation at which the second axis is aligned with the optical axis. In a preferred embodiment the inventive lens assembly is disposed to provide two fields of view in opposing directions along the first axis, and a third field along the second axis.

BRIEF DESCRIPTION OF THE DRAWINGS

FIG. 3b shows a front view of the portion of the longitudinal member of the inventive lens assembly.

FIG. 3c is an isolated perspective view of the longitudinal member of the inventive lens assembly.

FIG. 4 shows an illustrative representation of a telescopic lens arrangement included within the inventive multiple field of view lens assembly.

FIG. 5 shows an illustrative representation of the telescopic lens arrangement oriented in the wide field of view configuration.

DETAILED DESCRIPTION OF THE INVENTION

Figure 1:
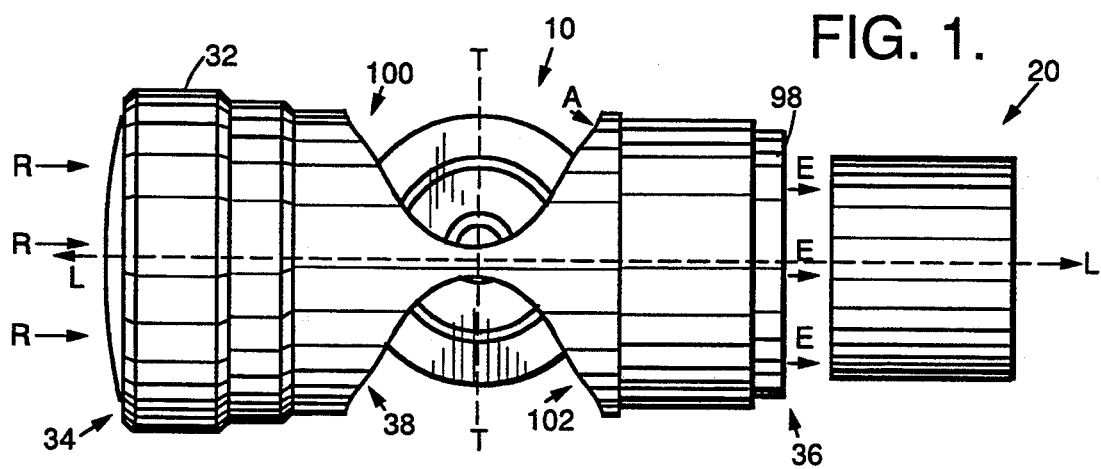
FIG. 1 shows an illustrative side view of an imaging sensor arrangement which includes a preferred embodiment of the multiple field of view lens assembly of the present invention oriented to provide a narrow field of view to the detector assembly.

FIG. 1 shows an illustrative side view of an imaging sensor arrangement 1 which includes a preferred embodiment of the multiple field of view lens assembly 10 of the present invention. The invention is adapted for use in an airborne vehicle such as a missile (not shown). The sensor arrangement 1 circumscribes a longitudinal optical axis L and includes a sensor (not shown) within a dewar detector assembly 20. The sensor within the detector assembly 20 is operative to collect collimated electromagnetic radiation R from a distant scene (not shown). The inventive lens assembly 10 includes a housing 32 centered about the axis L in which is disposed a telescopic lens arrangement to be described hereinafter. The housing 32 may be constructed of metal, plastic or other suitably rigid material.

Figure 2:
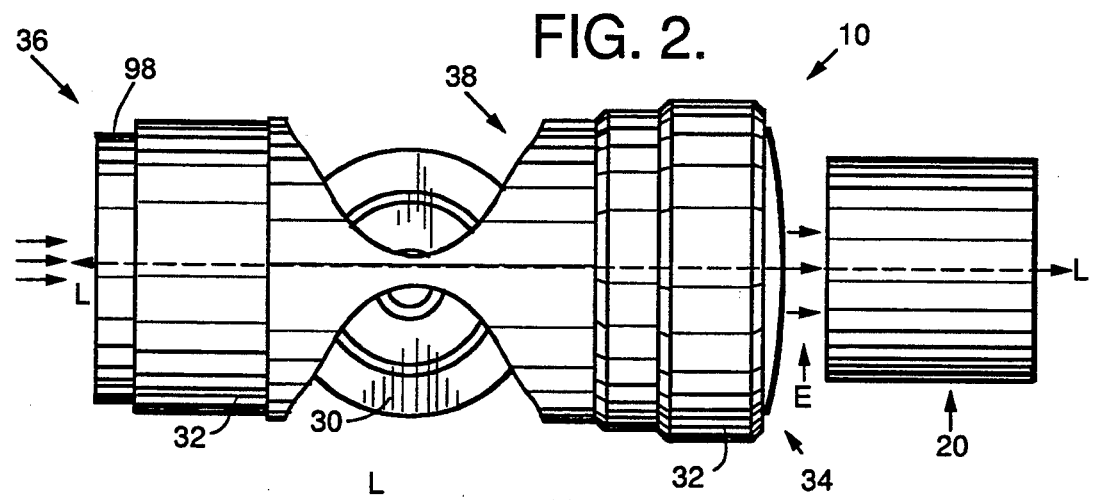
FIG. 2 depicts the inventive lens assembly in an orientation providing a wide field of view to a detector assembly.
Figure 3A:
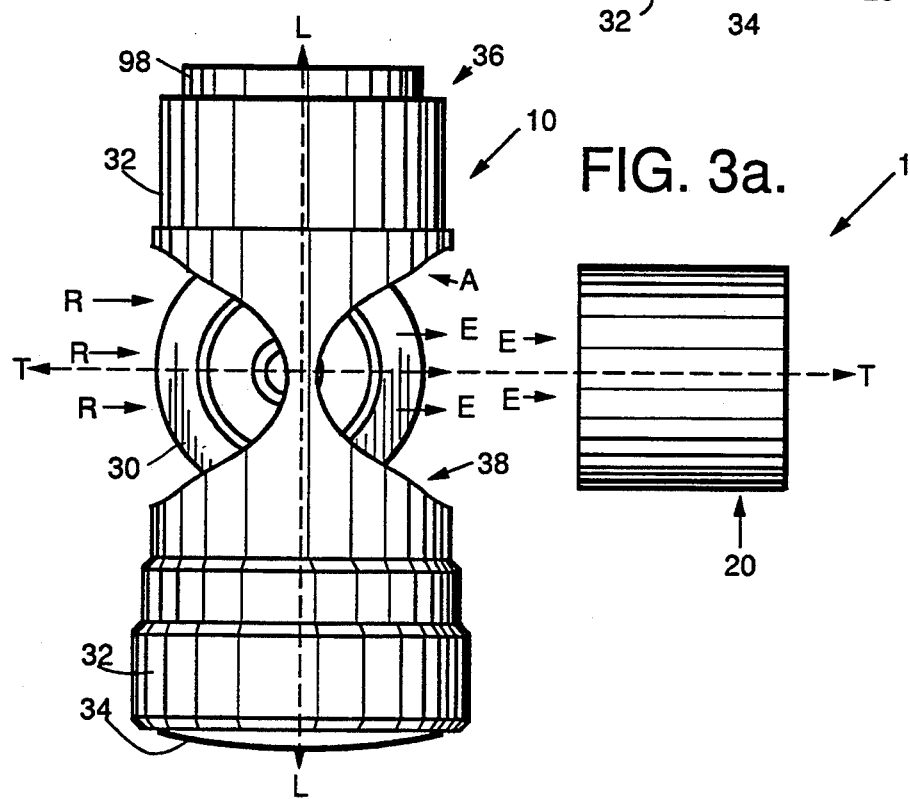
FIG. 3a depicts the inventive lens assembly in an orientation providing an intermediate field of view to the detector assembly.

In response to the incident scene radiation R, the assembly 10 forms a collimated exit beam E which impinges on the detector dewar assembly 20. As is described more fully below, the lens assembly 10 may be placed in three separate orientations relative to the detector assembly 20 to provide narrow, intermediate and wide fields of view thereto. Specifically, FIGS. 1, 2 and 3a depict the lens assembly 10 in orientations providing the narrow, wide and intermediate fields of view, respectively, to the detector assembly 20. The narrow and wide fields of view are along a common, first, line of sight, while the intermediate field of view is along a second line of sight which is transverse to the first line of sight. A common gimballed rotation mechanism 30 is operative to rotate (in the plane of FIGS. 1, 2 and 3a) the lens assembly 90 and 180 degrees giving rise the three fields of view.

Referring to the narrow field of view configuration depicted in FIG. 1, the housing 32 of the inventive lens assembly 10 has a first end 34, a second end 36, and a hollow longitudinal preferably cylindrical member 38. The longitudinal member 38 is hollowed as necessary about the axis L so as not to impede the passage of radiant energy through the lens assembly 10 of the present invention. The longitudinal member 38 is rigidly connected to the gimballed rotation mechanism 30, and is provided with openings 100, 102 defining an aperture A about the T axis as shown in FIG. 3c. The rotation mechanism 30 includes a conventional mechanical servo arrangement for driving a gimballed surface (not shown) mechanically linked to the longitudinal member 38.

As shown in FIG. 3a, the aperture A is aligned along a transverse axis T, normal to the longitudinal axis L. The aperture A is dimensioned such that the longitudinal member 38 does not obstruct the inherent field of view of the detector assembly 20 in the intermediate field of view orientation. That is, the detector assembly 20 will typically include a focal plane array which may be realized, for example, by a charge-coupled device (CCD) detector array. The collimated scene energy E exiting the inventive lens assembly 10 (in the narrow and wide field of view modes), or passing through the aperture A (in the intermediate field of view mode) is then focused upon the detector assembly 20 by conventional optics associated therewith (not shown).

FIG. 3b shows a front view looking along the T axis of the portion of the longitudinal member 38 which defines the aperture A. The aperture A, which may appear circular as viewed along the T axis, is of a transverse dimension W and longitudinal dimension H. Again, the dimensions W and H are selected such that the field of view of the focal plane array within the assembly 20 will not be obscured in the intermediate field of view orientation. The contours of the exterior walls of the longitudinal member 38 are not significant, although cylindrical is the preferred form as shown in FIG. 3c.

FIG. 3c is an isolated perspective view of the longitudinal member 38 of the inventive lens assembly. The member 38 is shown with the servo mechanism 30 with associated electrical control 31.

FIG. 4 shows an illustrative representation of the telescopic lens arrangement 40 included within the housing 32. The lens arrangement 40 includes an objective lens 42 disposed proximate the first end 34 of the housing 32 and further includes an eyepiece lens 43 positioned adjacent the second end 36 of the housing. The lens arrangement 40 forms an afocal Keplerjan telescope, and as a consequence the objective and eyepiece lenses 42 and 43 share a common focal point within the housing 32. The lens arrangement 40 is afocal in that collimated scene radiation R is collected and is then combined to provide the collimated exit beam E.

In the narrow field of view configuration (FIG. 1), the scene radiation R impinges on the objective lens 42. In contrast, when the lens assembly 10 is oriented in the wide field of view configuration (FIG. 2) the scene radiation R is incident upon the lens 43. This reverses the roles of the objective and the eyepiece.

As shown in FIG. 4, the objective lens 42 includes first, second and third lens elements 44, 46 and 48 respectively. The first and second lens elements 44 and 46 may be characterized as being positive meniscus, while the third lens element 48 is of the negative meniscus type. The first lens element 44 includes first and second surfaces 50 and 52, and does not contact the second lens element 46. The second lens element 46 has third and fourth surfaces 54 and 56, while the third lens element includes fifth and sixth surfaces 58 and 60. The second and third lens elements 46 and 48 are separated at the vertices thereof (i.e. the points on each lens element intersected by the axis L), but are in contact over the portion of the fourth and fifth surfaces 56 and 58 within approximately 0.10 inches of the edge of each lens.

The eyepiece lens 43 includes fourth, fifth, sixth and seventh lens elements 70, 72, 74 and 76 respectively. The fourth element 70 may be described as positive meniscus, while the fifth and seventh elements 72 and 76 are of the plano convex variety. The sixth element 74 may be characterized as negative meniscus, and contacts the fifth element 72 in the vicinity of the edges thereof. The fourth element 70 is defined by seventh and eighth surfaces 80 and 82, while the fifth element 72 has a planar ninth surface 84 and a convex tenth surface 86. The sixth lens element 74 has an eleventh surface 88 in edge contact with the tenth surface 86, and also includes a twelfth surface 90. The seventh lens element 76 is defined by a planar thirteenth surface 92 and a convex fourteenth surface 94.

As will be evident to those skilled in the art, the lenses 42 and 43 may be designed to yield a range of magnification ratios through adjustment of, for example, the radii of curvature, thickness and spacing of each lens element. A complete optical prescription for the telescopic lens assembly 40, yielding a magnification ratio of 6.4 between the narrow and wide field of view orientations, is nonetheless set forth below. It is noted that a magnification ratio of 6.4 corresponds to image magnification in the narrow field of view orientation (FIG. 1) of $(6.4)^{\frac{1}{2}}$, and image reduction in the wide field of view orientation (FIG. 2) of $(6.4)^{\frac{1}{2}}$. The "Front" radii of curvature specified below refers to that of the left side of each lens element per the side view of FIG. 4. In addition, the spacing between the vertices of the first and second lens elements is denoted by "Space$_1$", the spacing between the vertices of the second and third elements by "Space$_2$, and so on. The appropriate chemical abbreviation for the glass type included in each element is also indicated (e.g. Si for silicon). Dimensions are given in inches.

| Optical Prescription - Magnification Ratio of 6.4 | | | |
|---|---|---|---|
| Lens | Glass | Radius of Curvature | | Vertex |
| Element | Type | Front | Back | Thickness |
| 1st (44) | Si | 4.06000 | 7.23270 | 0.223000 |
| Space$_1$ | — | — | — | 0.020000 |
| 2nd (46) | Si | 2.70790 | 4.37240 | 0.268000 |
| Space$_2$ | — | — | — | 0.016445 |
| 3rd (48) | Ge | 4.73860 | 2.72280 | 0.250000 |
| Space$_3$ | — | — | — | 3.022098 |
| 4th (70) | Si | −0.83950 | −0.94530 | 0.300000 |

-continued

Optical Prescription - Magnification Ratio of 6.4

| Lens Element | Glass Type | Radius of Curvature Front | Radius of Curvature Back | Vertex Thickness |
|---|---|---|---|---|
| Space$_4$ | — | — | — | 0.301864 |
| 5th (72) | ZnSe | infinity | −1.90374 | 0.248000 |
| Space$_5$ | — | — | — | 0.005367 |
| 6th (74) | Ge | −1.84130 | −3.85230 | 0.150000 |
| Space$_6$ | — | — | — | 0.020000 |
| 7th (76) | Si | infinity | −4.57110 | 0.150000 |

With knowledge of the parameters associated with the focusing optics included within the detector assembly 20, those skilled in the art may modify the above optical prescription for the inventive lens assembly 10 to effect a desired magnification within the imaging sensor arrangement 1. In addition, the telescopic housing 32 is longitudinally dimensioned such that a desired separation is maintained between the first end 34 thereof and the detector assembly 20 in the wide field of view orientation, and between the second end 36 thereof and the assembly 20 in the narrow field of view orientation. Again, the appropriate separation between the lens assembly 10 and the detector assembly 20 will depend on the particular focusing optics employed within the assembly 20.

FIG. 5 shows an illustrative representation of the telescopic lens arrangement 40 in the wide field of view configuration (FIG. 2). As can be seen by comparing FIGS. 4 and 5, the lens arrangement 40 is rotated by 180 degrees between the wide and narrow field of view configurations. In the wide field of view orientation depicted in FIG. 5 collimated scene radiation R is incident on the lens 43. The incident scene radiation R is then focused upon a focal point common to the lenses 42 and 43 included within the lens arrangement 40. The focused scene radiation is then converted to the collimated exit beam E which propagates from the lens 42 to the detector assembly 20.

As mentioned previously, the optical prescription given above yields a telescopic lens arrangement with a magnification ratio of 6.4. Assuming the detector assembly 20 provides an intermediate field of view magnification (FIG. 3a) of "B", then in the narrow field of view configuration of FIG. 1 the magnification provided by the arrangement 1 is substantially equal to $B(6.4)^{\frac{1}{2}}$. Or, equivalently, in the orientation of FIG. 1 the detector assembly 20 operates with the assistance of the inventive lens assembly 10 to collect radiation from a field of view narrower by the factor $(6.4)^{-\frac{1}{2}}$ than the intermediate field of view. Similarly, in the wide field of view orientation depicted in FIG. 2 the magnification effected by the sensor arrangement 1 is given by $B(6.4)^{-\frac{1}{2}}$. Accordingly, the field of view effectively spanned by the detector assembly 20 in the orientation of FIG. 2 is broadened by the factor $(6.4)^{\frac{1}{2}}$ relative to the intermediate field of view encompassed by the assembly 20 through the aperture A defined by the housing 32.

The first, second and third lens elements 44, 46 and 48 of the objective lens 42 are secured in the housing 32 within a cylindrical chamber (not shown) defined thereby. The chamber is conventionally bored such that upon insertion therein a predetermined distance from the first end 34 of the housing 32 the edges of the lens elements 44, 46 and 48 contact the interior of the chamber. The first lens element 44 is anchored within the housing 32 via conventional bonding. The second and third elements are secured by threaded retainer.

The fourth, fifth, sixth and seventh lens elements 70, 72, 74 and 76 of the eyepiece lens 43 are conventionally bonded within the threaded insert 98 (FIG. 1). Again, the fifth and sixth elements 72 and 74 are secured by edge contact with the surface of a cylindrical chamber defined by the insert 98. A thin metal ring (not shown) bonded within this chamber may be interposed between the sixth and seventh lens elements 74 and 76 to provide the appropriate spacing therebetween. The fifth, sixth and seventh elements 72, 74, and 76 will typically be conventionally bonded within the insert 98 or secured by threaded retainer. A threaded cylindrical chamber of a diameter substantially identical to that of the cylindrical threaded insert 98 is bored within the housing 32 to receive the insert 98. The insert 98 is rotated about the telescopic axis L into the housing 32 until the desired spacing is achieved between the objective lens 42 and the fourth, fifth, sixth and seventh elements 70, 72, 74 and 76 of the eyepiece lens 43. In this manner, the focus of the inventive assembly 10 may be adjusted in response to, for example, imperfections in the surfaces or spacing of the elements of the telescopic lens 40.

As mentioned in the Background of the Invention, certain conventional detector focusing arrangements become out of focus as a consequence of temperature fluctuation. Typically, a complex mechanical device is used to move individual lens elements so that proper focus is ostensibly maintained over a particular temperature range. The telescopic lens arrangement 40 included within the present invention is designed to be substantially athermal, and hence obviates the need for external mechanical focus compensation. Again, an athermal optical system is synthesized by selecting positive and negative lens elements which experience offsetting temperature-induced changes in focusing power. The inventive seven-element arrangement 40 is particularly advantageous in this regard as it affords more degrees of freedom to the designer than are generally available using conventional focusing schemes. Specifically, the seven-element design of the present invention may allow for the simultaneous correction of temperature-induced defocusing and, for example, deficiencies in the detector assembly 20 such as off-axis field aberrations.

While the present invention has been described herein with reference to a particular embodiment, it is understood that the invention is not limited thereto. The teachings of this invention may be utilized by one having ordinary skill in the art to make modifications within the scope thereof. For example, the invention is not limited to the particular construction of the telescopic housing. The invention is further not limited to the specific seven-element telescopic lens arrangement described herein. Telescopes including a different number of lens elements may be substituted therefor in alternative embodiments of the present invention.

It is therefore contemplated by the appended claims to cover any and all such modifications. Accordingly,

What is claimed is:

1. In an imaging system having an optical axis and a sensor aligned therewith, a multiple field of view sensor lens assembly comprising:
   rotatable telescope means for providing first and second fields of view for said sensor, said first field of view being along a first axis thereof and said second field of view being along a separate second axis thereof; and means for rotating said telescope means from a first orientation at which said first axis is aligned with said optical axis to a second orientation at which said second axis is aligned with said optical axis and to a third orientation at which said first axis is aligned with said optical axis;

wherein said telescope means includes a housing and a first lens arrangement having first, second and third lens elements circumscribing said first axis, said first lens arrangement positioned within said housing proximate a first end thereof and a second lens arrangement having fourth, fifth, sixth and seventh lens elements circumscribing said first axis, said second lens arrangement positioned within said housing proximate a second end thereof.

2. The lens assembly of claim 1 wherein said first and second lens arrangements are selected such that said third field of view is larger than said second field of view.

3. The lens assembly of claim 2 wherein said first, second, and fourth lens elements are positive meniscus, said third and sixth lens elements are negative meniscus and said fifth and seventh lens elements are plano convex.

4. The lens assembly of claim 3 wherein said housing includes a threaded insert in which are disposed said selected elements from said second lens arrangement, with the distance between said selected elements and said first lens arrangement being adjustable by turning said insert while said insert is at least partially inserted in said housing.

5. The lens assembly of claim 4 wherein said first, second, third, fourth, fifth, sixth and seventh lens elements are selected such that said lens assembly is substantially passively athermal.

6. A multiple field of view imaging sensor assembly for a missile comprising:

a sensor having an optical axis;

rotatable telescope means for providing first and second fields of view for said sensor, said first field of view being along a first axis thereof and said second field of view being along a separate second axis; and means for rotating said telescope means from a first orientation at which said first axis is aligned with said optical axis to a second orientation at which said second axis is aligned with said optical axis;

wherein said telescope means includes a housing and a first lens arrangement having first, second and third lens elements circumscribing said first axis, said first lens arrangement positioned within said housing proximate a first end thereof and a second lens arrangement having fourth, fifth, sixth and seventh lens elements circumscribing said first axis, said second lens arrangement positioned within said housing proximate a second end thereof.

7. The imaging sensor assembly of claim 6 wherein said means for rotating further includes means for positioning said telescope means in a third orientation to provide a third field of view for said sensor.

* * * * *